United States Patent [19]

Ferry et al.

[11] 4,134,367
[45] Jan. 16, 1979

[54] ELECTRONIC FUEL INJECTION CONTROL

[75] Inventors: William R. Ferry; James R. Voss, both of Springfield, Mass.

[73] Assignee: The United States of America as represented by the Secretary of the Army, Washington, D.C.

[21] Appl. No.: 800,681

[22] Filed: May 26, 1977

[51] Int. Cl.² .......................... F02B 3/00; F02P 5/14
[52] U.S. Cl. .......................... 123/32 EA; 123/117 R
[58] Field of Search ......... 123/32 EA, 117 R, 32 EB, 123/32 EC

[56] References Cited

U.S. PATENT DOCUMENTS

| | | | |
|---|---|---|---|
| 3,430,616 | 3/1969 | Glockler et al. | 123/32 EA |
| 3,809,029 | 5/1974 | Wakamatsu et al. | 123/32 EA |
| 3,835,820 | 9/1974 | Fujisawa | 123/32 EA |
| 3,885,720 | 5/1975 | Brennan | 123/17 R |
| 3,890,938 | 6/1975 | Oishi et al. | 123/32 EA |
| 3,914,580 | 10/1975 | Watson et al. | 123/32 EB |
| 3,945,350 | 3/1976 | Ford | 123/32 EC |
| 4,047,507 | 9/1977 | Noguchi et al. | 123/32 EA |

Primary Examiner—Charles J. Myhre
Assistant Examiner—P. S. Lall
Attorney, Agent, or Firm—Peter A. Taucher; John E. McRae; Nathan Edelberg

[57] ABSTRACT

Engine fuel injector control circuitry comprising a pulse generator that produces long duration pulses. NOR gate circuitry is actuated by each pulse to operate a ramp generator. The ramp generator output changes at a rate determined by current flow generated by an engine speed sensor. Ramp generator output is applied to an input terminal of a comparator to produce rapid switching of the comparator output for starting the injection of fuel into an engine cylinder. Injection is terminated by the trailing end of the long duration pulse.

1 Claim, 3 Drawing Figures

ELECTRONIC FUEL INJECTION CONTROL

The invention described herein may be manufactured, used, and licensed by or for the government for governmental purposes without payment to us of any royalty thereon.

BACKGROUND AND SUMMARY OF THE INVENTION

U.S. Pat. No. 3,587,535 discloses engine fuel injector control means that includes a mechanical means for varying the fuel injection advance in accordance with changing engine speed. The present invention relates to engine fuel injector control means that utilizes electrical means for achieving a variable fuel injector advance. In its preferred form the invention utilizes a single speed sensor network and timing advance circuit for the individual injector energizer circuits; this arrangement minimizes duplication of components and thus reduces overall costs.

THE DRAWINGS

Figure 1:
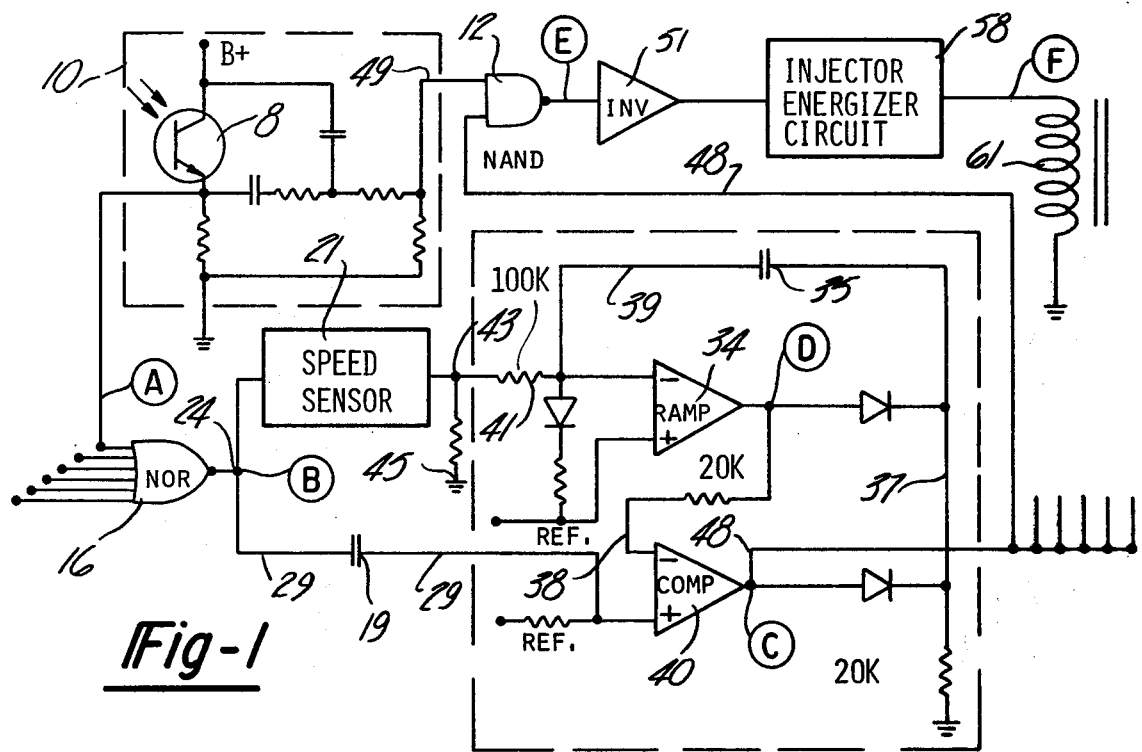
FIG. 1 is a block diagram showing circuitry embodying this invention.
Figure 2:
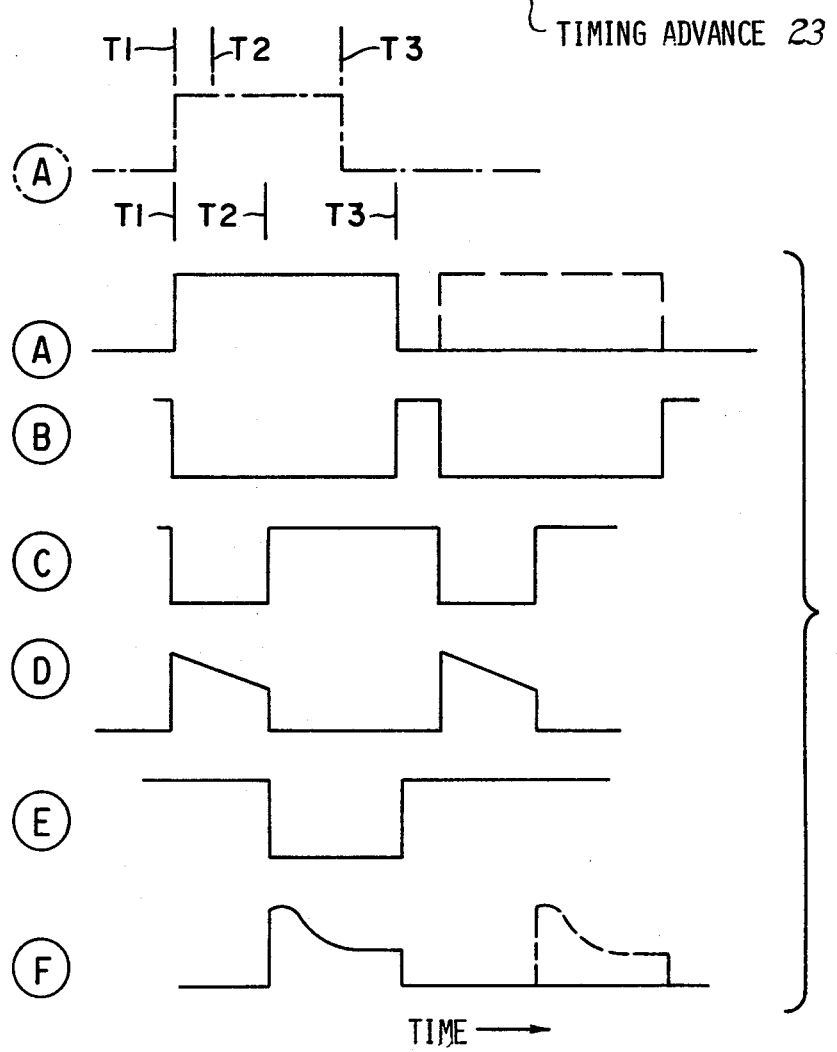
FIG. 2 is a chart depicting electric potential or signal value at different points throughout the FIG. 1 circuitry.
Figure 3:
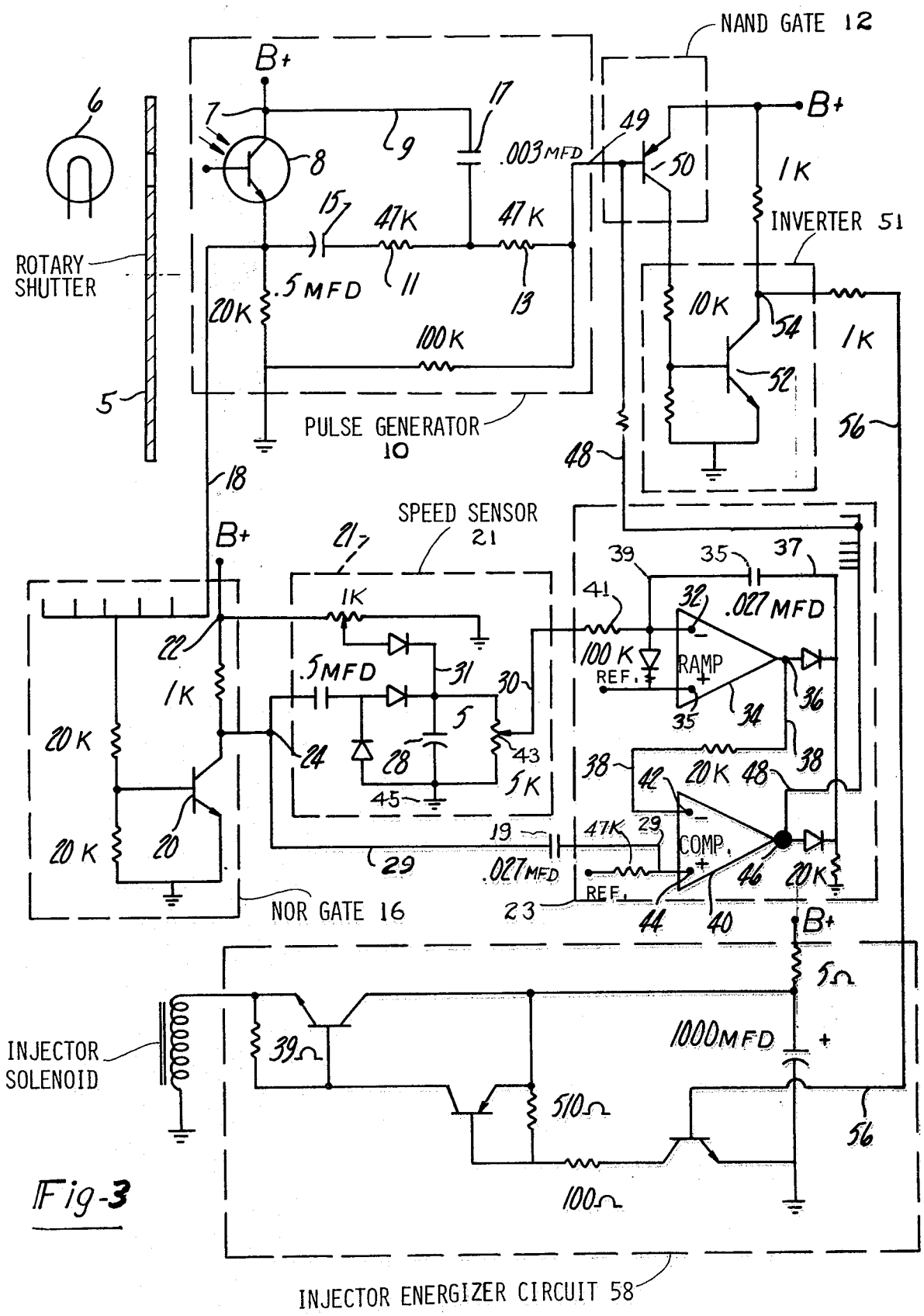
FIG. 3 illustrates certain circuit components and connections used in the FIG. 1 block diagram circuit.

The circuitry shown in FIGS. 1 and 3 comprises a pulse generator 10 designed to deliver long duration pulses A through line 18 to a NOR gate 16 in timed relation to the engine; the width of each pulse A is shown in FIG. 2 as the time span between T1 and T3. An actual system would include a number of pulse generators 10, one for each cylinder of the engine. Each pulse generator would provide an input pulse to NOR gate 16.

Pulse generator 10 may be constructed generally similar to generator 120 in aforementioned U.S. Pat. No. 3,587,535. In FIG. 3 of the present drawings the generator is depicted as a phototransistor 8 located to receive light input from light source 6 when permitted by the engine-driven shutter 5. An actual system would comprise a number of "light source-phototransistor" assemblies arranged at opposite faces of a single rotary shutter 5, whereby the phototransistors are successively energized during the course of one shutter revolution. Phototransistor output signals are applied through individual circuit lines 18 to the NOR gate 16.

As seen in FIG. 3 the NOR gate includes a transistor 20 that is fired on by each pulse A to produce a low potential at terminal 24; the high-low potential at terminal 24 is designated by curve B in FIG. 2.

The NOR gate is associated with a speed sensor circuit 21 and timing advance circuit 23 that are cooperatively designed to initiate a positive pulse C in line 48 at a predetermined time T2 after the onset of the generated pulse A (time T1). Time T2 represents the "start-to-open" time for the injector. The injector is closed or stopped at time T3 by termination of pulse A; fuel injection endures between T2 and T3. In FIG. 2 curve F illustrates current flow through the injector solenoid during the injection period. A second dotted line is added to curve F merely to show solenoid injector action at the next cylinder in the cycle.

Due to the nature of generator 10 the width of pulse A is inversely proportional to engine speed. In FIG. 2 a "short" pulse A (produced during high speed operation of the engine) is shown in phantom directly above the full line curve A. To maintain a sufficient injection duration time at high engine speed it is then necessary to start the injection sooner in the cycle; in phantom curve A the injection start time T2 is made to occur near time T1 to provide a sufficient injection period (T2 to T3). Speed sensor 21 interacts with timing advance 23 to forwardly adjust the injection start time T2 according to engine speed.

As seen in FIG. 1, the timing advance circuit 23 comprises a ramp generator 34 and comparator 40. Output D of the ramp generator and output C of the comparator connect with a line 37 arranged to charge a capacitor 35 at different times in the cycle. The capacitor charge is applied through line 39 to the inverting input of the ramp generator and resistor 41. The output of speed sensor 21 determines the potential at terminal 43, hence the current flow through resistor 41 toward ground 45. Therefore the output of speed sensor 21 determines the current in resistor 41 and hence the slope of the ramp generator output D.

Positive output signal D from the ramp generator is applied through line 38 to the inverting input of comparator 40. When the signal into the comparator inverting input terminal reaches the comparator reference voltage at the proportional terminal the comparator output C is switched from the low state to the high state. A high pulse is thereby sent through line 48 to NAND gate 12. This switch action of the comparator occurs at time T2 and indirectly starts the injector delivering fuel to the engine.

NAND gate 12 includes two inputs represented by lines 48 and 49 leading from timing advance 23 and pulse generator 10. Positive "high" inputs into the NAND gate produce a low output signal E, which is converted to a high signal by inverter 51. The high signal is amplified by an energizer circuit 58 similar to the corresponding circuit in U.S. Pat. No. 3,587,535. Energizer current, designated by curve F in FIG. 2, is applied to the injector solenoid 61 to cause fuel to be delivered to the associated cylinder of the engine.

At time T3 the injector solenoid 61 is deenergized to start the restore phase of the injector cycle. This comes about because line 49 at that time begins delivering a low signal to NAND gate 12, i.e. generator 10 at that time goes "low" as designated by curve A in FIG. 2.

Switching of generator 10 to the low output state causes NOR gate output B to go to its high condition. During the time interval from the end of one pulse A to the beginning of the next pulse A (T3 to T1) the NOR gate output B charges line 29 through capacitor 19. The proportional terminal of the comparator is thereby at high potential, so that the comparator output charges capacitor 35 through line 37. The comparator thus resets the ramp generator circuit for the next cyclic excursion. At the onset of the next pulse A the NOR gate output B will go low to reset comparator 40.

Change in engine speed changes the charge on the positive plate of capacitor 28, thereby changing current flow through resistor 41. As a result, the ramp generator output changes at a different rate necessary to satisfy the current flow rate across capacitor 35. The "different" rate of output change registers as a different slope in curve D (FIG. 2). At high engine speeds the slope will be relatively steep so that the ramp generator output will drop to the comparator switching level at a time T2 closer to time T1. At low engine speeds the slope in curve D will be relatively shallow so that time T2 will be further away from time T1. The aim is to have the "injector on" time spacing (T2 to T3) substantially the same for all engine speeds.

Some modifications may be made in the circuitry while still operating within the spirit of the invention, as comprehended by the attached claims.

We wish it to be understood that we do not desire to be limited to the exact details of construction shown and described for obvious modifications will occur to a person skilled in the art.

We claim:

1. Engine fuel injector control means comprising in combination: a pulse generator (10) for each injector timed by the engine so that the width of the generated pulse is inversely related to engine speed; a NOR gate (16) having input terminals connected to the various pulse generators for developing trigger signals (B) having the same width as the generated pulse (A); speed sensor means (21) comprising a capacitor (28) for developing an analog signal directly related to engine speed; timing advance means (23) comprising a ramp generator (34) and a comparator (40); said ramp generator having a first input terminal connected to a reference voltage source and a second input terminal connected to the speed sensor means; said comparator having one input terminal connected with a second reference voltage source and another input terminal (42) connected with the ramp generator output; the comparator output being connected through a capacitor (35) to the second input terminal of the ramp generator; the ramp generator and comparator being interconnected so that the comparator output is switched between low and high states when the ramp generator output slews to the second reference voltage; the ramp generator being constructed so that its slew rate is directly proportional to the value of the input analog signal developed by the speed sensor means, whereby the comparator switching time is inversely proportional to engine speed; the comparator reference voltage source being connected to the NOR gate output, whereby the condition of the NOR gate output determines the operating mode of the comparator; a NAND gate 12 for each injector, each NAND gate having one input terminal connected to a corresponding pulse generator and another input terminal connected to the comparator output (C), whereby the NAND gate output signal (E) will be initiated by the comparator output (C) and terminated by the generated pulse (A); and an injector energizer circuit 58 connected to each NAND gate output.

* * * * *